(12) United States Patent
Huang (10) Patent No.: US 9,761,250 B1
(45) Date of Patent: Sep. 12, 2017

(54) RECORD PLAYER

(71) Applicant: YA HORNG ELECTRONIC CO., LTD., Tainan (TW)

(72) Inventor: Jin-Yi Huang, Tainan (TW)

(73) Assignee: YA HORNG ELECTRONIC CO., LTD., Tainan (TW)

( * ) Notice: Subject to any disclaimer, the term of this patent is extended or adjusted under 35 U.S.C. 154(b) by 0 days.

(21) Appl. No.: 15/453,050

(22) Filed: Mar. 8, 2017

(51) Int. Cl.
| | |
|---|---|
| *G11B 17/04* | (2006.01) |
| *G11B 3/00* | (2006.01) |
| *H04N 5/225* | (2006.01) |
| *G06T 7/246* | (2017.01) |
| *G11B 19/26* | (2006.01) |

(52) U.S. Cl.
CPC .............. *G11B 3/007* (2013.01); *G06T 7/248* (2017.01); *G11B 19/26* (2013.01); *H04N 5/2253* (2013.01); *H04N 5/2256* (2013.01)

(58) Field of Classification Search
CPC ........... G11B 7/00; G11B 7/0032; G11B 3/02; G11B 17/16; G11B 17/04; G11B 17/02; G11B 19/26; G11B 17/00; G11B 19/265; G11B 19/20; G11B 19/2009

USPC .... 369/125, 158, 189, 190, 192.1, 239, 266; 348/68, 61, 94

See application file for complete search history.

(56) References Cited

U.S. PATENT DOCUMENTS 8,964,015 B2 * 2/2015 Bae .......................... B04B 13/00
348/61

\* cited by examiner

*Primary Examiner* — Nabil Hindi
(74) *Attorney, Agent, or Firm* — Burris Law, PLLC (57) ABSTRACT

A record player includes a base, a platter, a tonearm assembly and a monitoring unit. The monitoring unit is secured on the base, and includes a light emitter, an image capturing module and a processing module. The light emitter can emit light toward the platter or an acoustical record disposed on the platter. The image capturing module can receive the light reflected by the platter or the acoustical record, and capture images of the platter or the acoustical record. The processing module can receive the images from the image capturing module, and determine a current rotating speed of the platter or the acoustical record by analyzing and comparing the images captured by the image capturing module at successive time points.

12 Claims, 8 Drawing Sheets

RECORD PLAYER

FIELD

The disclosure relates to an audio player device, and more particularly to a record player.

BACKGROUND

Figure 1:
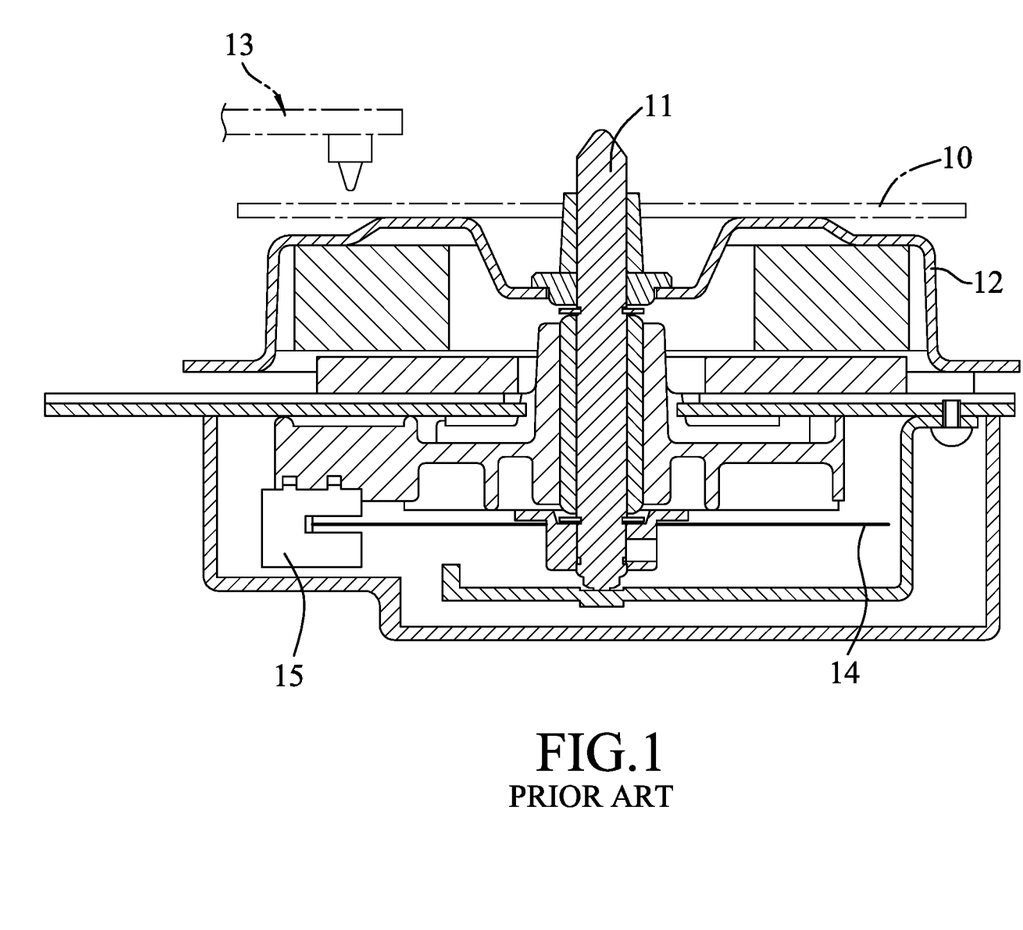
FIG. 1 is a fragmentary sectional view of a conventional record player.

Referring to FIG. 1, a conventional record player for playing an acoustical record 10 includes a spindle 11, a platter 12, a tonearm assembly 13, a shading disk 14 and a conventional monitoring unit 15. The platter 12 is co-rotatably connected to the spindle 11, and allows the acoustical record 10 to be placed thereon. The tonearm assembly 13 is used to read the acoustical record 10 for producing sound stored by the acoustical record 10. The shading disk 14 is co-rotatably connected to a bottom end of the spindle 11, has a surface provided with multiple marks arranged radially and spaced angularly from each other, and can coaxially co-rotate with the platter 12 as well as the acoustical record 10 placed on the platter 12. The conventional monitoring unit 15 is configured to detect a rotating speed and a rotating direction of the shading disk 14.

Since the shading disk 14 co-rotates with the platter 12 and the acoustical record 10, the rotating speed and the rotating direction of the shading disk 14 detected by the conventional monitoring unit 15 are substantially identical to a rotating speed and a rotating direction of the acoustical record 10. In detail, light reflected by the shading disk 14 may vary due to the marks thereon. Accordingly, the conventional monitoring unit 15 is configured to detect variation of brightness of the light reflected by the shading disk 14, so as to determine the rotating speed of the shading disk 14, and in turn the rotating speed of the acoustical record 10. However, it is necessary to provide an additional inner space in the conventional record player to accommodate the shading disk 14.

SUMMARY

Therefore, an object of the disclosure is to provide a record player that can alleviate at least one of the drawbacks of the prior art.

According to an aspect of the disclosure, the record player is for playing an acoustical record, and includes a base, a platter, a tonearm assembly and a monitoring unit.

The platter is rotatably mounted on the base, and is configured to support the acoustical record thereon. The tonearm assembly is pivotally mounted on the base, and is configured to read the acoustical record for producing sound stored by the acoustical record. The monitoring unit is secured on the base, and includes a light emitter, an image capturing module and a processing module. The light emitter is configured to emit light toward the platter. The image capturing module is configured to receive the light reflected by the platter and to capture images of the platter. The processing module is configured to receive the images of the platter from the image capturing module, and to determine a current rotating speed of the platter by analyzing and comparing the images captured by the image capturing module at successive time points.

According to another aspect of the disclosure, the record player is for playing an acoustical record, and includes a base, a platter, a tonearm assembly and a monitoring unit.

The platter is rotatably mounted on the base, and is configured to support the acoustical record thereon. The tonearm assembly is pivotally mounted on the base, and is configured to read the acoustical record for producing sound stored by the acoustical record. The monitoring unit is secured on the base, and includes a light emitter, an image capturing module and a processing module. The light emitter is configured to emit light toward the acoustical record. The image capturing module is configured to receive the light reflected by the acoustical record and to capture images of the acoustical record. The processing module is configured to receive the images of the acoustical record from the image capturing module, and to determine a current rotating speed of the acoustical record by analyzing and comparing the images captured by the image capturing module at successive time points.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
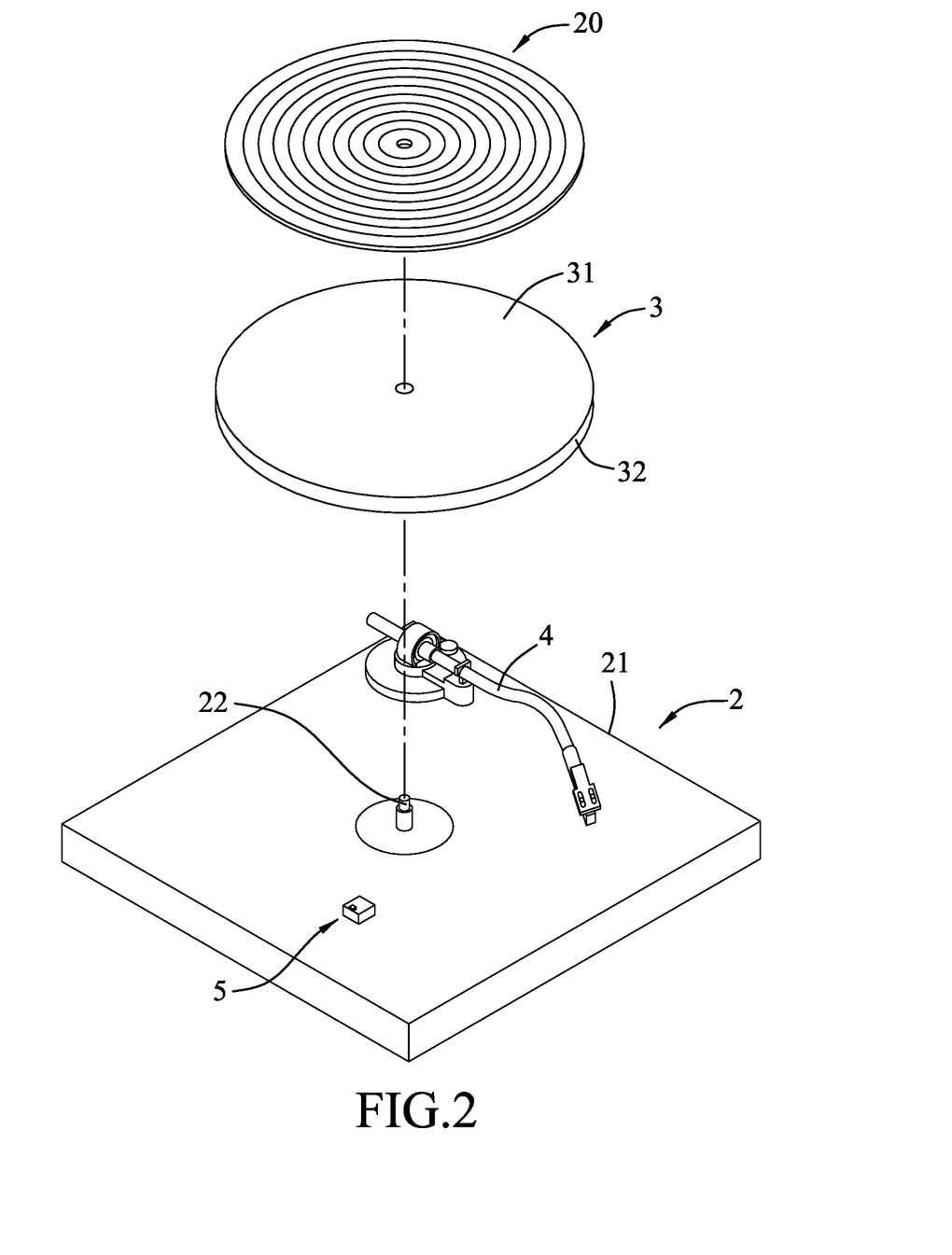
FIG. 2 is a perspective exploded schematic view of a first embodiment of the record player according to the disclosure.
Figure 3:
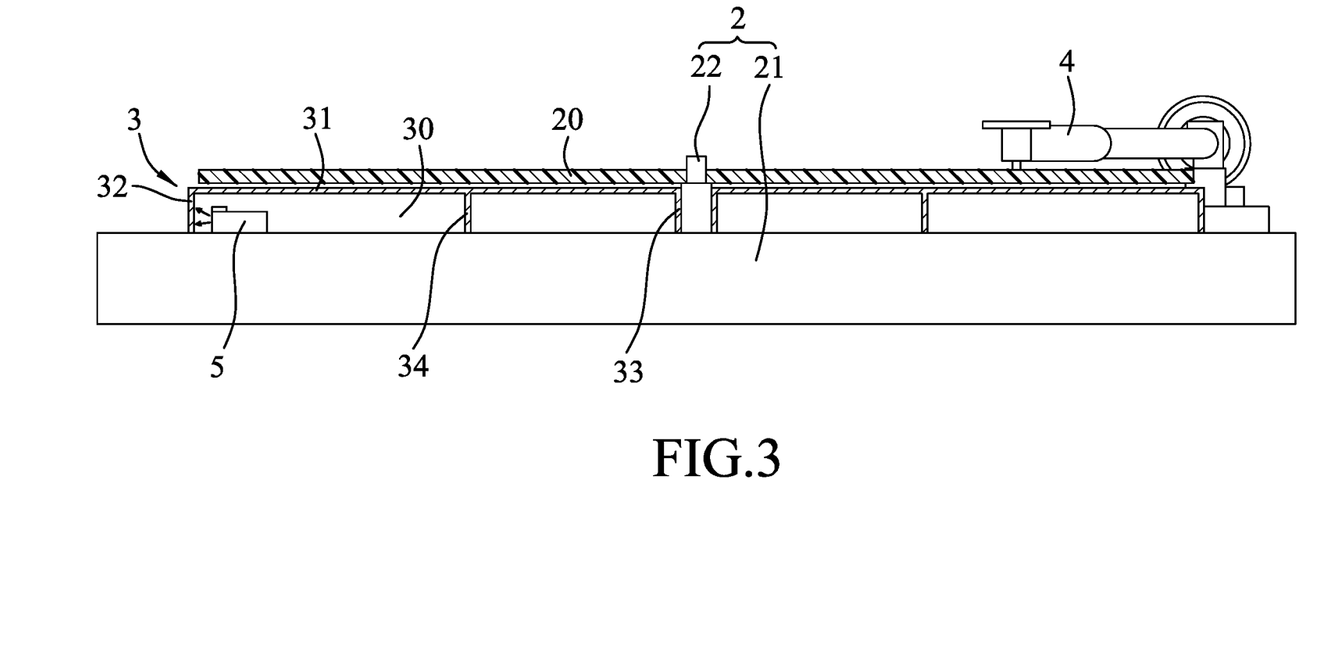
FIG. 3 is a partially sectional schematic view of the first embodiment of the record player.
Figure 4:
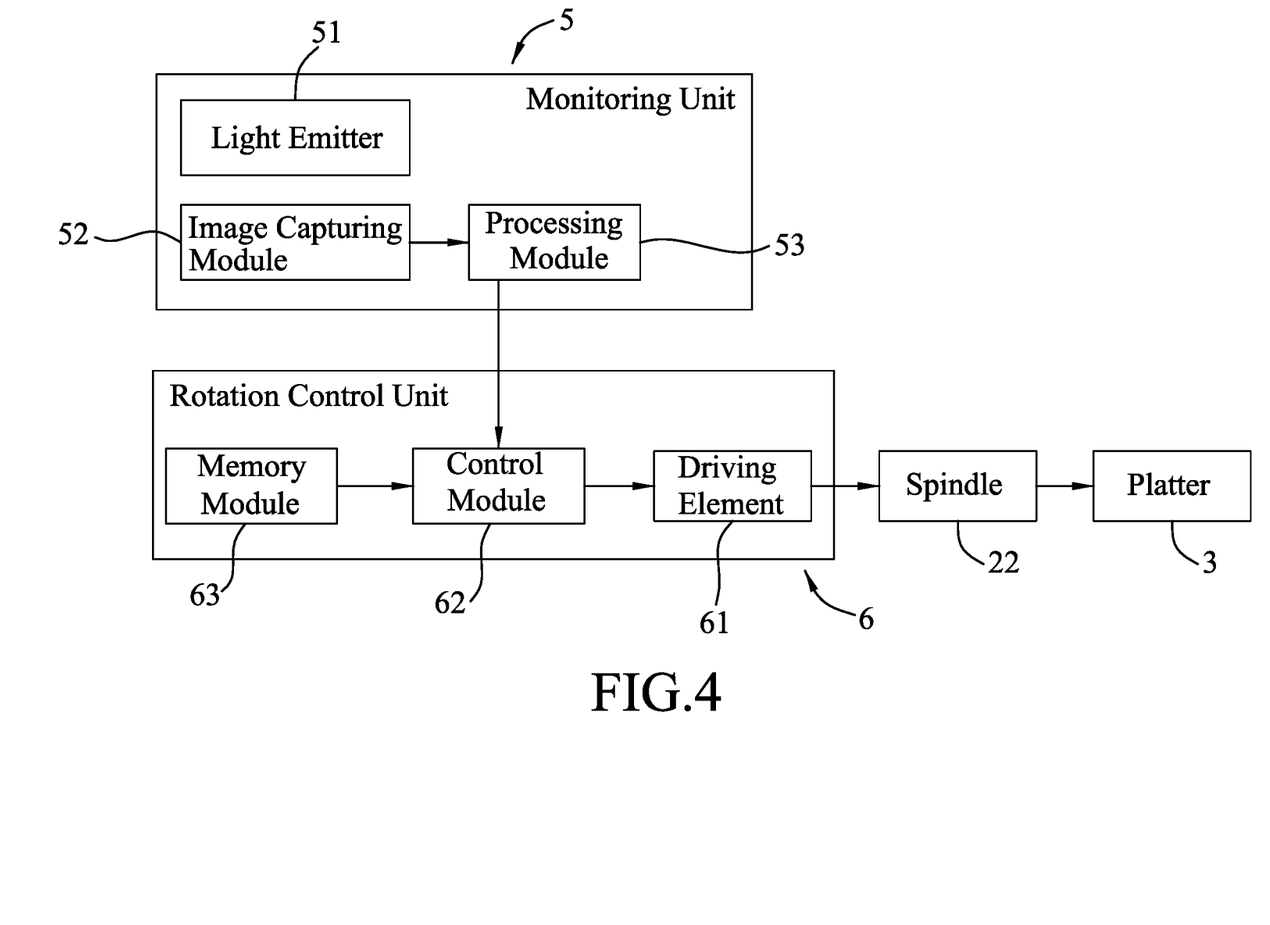
FIG. 4 is a block diagram of some elements of the record player according to some embodiments of this disclosure.

Referring to FIGS. 2 to 4, the first embodiment of a record player for playing an acoustical record 20 according to this disclosure includes a base 2, a platter 3, a tonearm assembly 4, a monitoring unit 5 and a rotation control unit 6. The acoustical record 20 is, for example, a gramophone record.

The base 2 includes a plinth 21, and a spindle 22 extending upwardly from the plinth 21.

The platter 3 is rotatably mounted on the base 2, is co-rotatably connected to the spindle 22, and is configured to support the acoustical record 20 thereon. The platter 3 includes a top plate 31 and an outer surrounding wall 32. The top plate 31 is horizontally disposed above the plinth 21, has a periphery, and is configured to support the acoustical record 20. The outer surrounding wall 32 extends downwardly from the periphery of the top plate 31 toward the base 2. The plinth 21, the top plate 31 and the outer surrounding wall 32 together define a space 30. The platter 3 further includes a spindle-surrounding wall 33 and an inner surrounding wall 34. The spindle-surrounding wall 33 extends from a center of the top plate 31 toward the plinth 21, and surrounds the spindle 22. The inner surrounding wall 34 extends from the top plate 31 toward the plinth 21, is disposed between the outer surrounding wall 32 and the spindle-surrounding wall 33, and surrounds the spindle-surrounding wall 33.

The tonearm assembly 4 is pivotally mounted on the plinth 21 of the base 2, and is configured to read the acoustical record 20 for producing sound stored by the acoustical record 20. For example, the tonearm assembly 4 includes a stylus for reading the acoustical record 20, a cartridge holding the stylus and converting movement of the stylus into an electrical signal, and a tonearm holding the cartridge and pivotally mounted on the plinth 21. Since the tonearm assembly 4 is well-known in the art, further details thereof will be omitted herein for the sake of brevity.

The monitoring unit 5 is secured on the base 2, and is disposed in the space 30. The monitoring unit 5 includes a light emitter 51, an image capturing module 52 and a processing module 53. The light emitter 51 and the image capturing module 52 are disposed at the same side of the base 2 as the platter 3. The light emitter 51 is configured to emit light toward the platter 3. The image capturing module 52 includes image sensors, such as complementary metal-oxide-semiconductor (CMOS) sensors, and is configured to receive the light reflected by the platter 3 and to capture images of the platter 3. For example, the image capturing module 52 is configured to capture the images periodically. In the first embodiment, both the light emitter 51 and the image capturing module 52 are arranged to face the outer surrounding wall 32, so that the light emitter 51 may emit the light toward the outer surrounding wall 32, and the image capturing module 52 may capture images of the outer surrounding wall 32 to serve as the images of the platter 3. The processing module 53 is configured to communicate with the image capturing module 52 for receiving the images of the platter 3 (i.e., the images of the outer surrounding wall 32 in this embodiment) therefrom, and to determine a current rotating speed of the platter 3 by analyzing and comparing the images captured by the image capturing module 52 at successive time points. For example, the processing module 53 is programmed to analyze and compare the images using digital image correlation (DIC). In some embodiments, the light emitter 51 and the image capturing module 52 can be arranged to face the top plate 31, so that the light emitter 51 can emit the light toward the top plate 31, and the image capturing module 52 can capture images of the top plate 31 to serve as the images of the platter 3. For example, the image capturing module 52 is configured to capture the images at a frequency that allows for a sufficient number of images captured within a single revolution of the platter 3 for performing the analysis. In some embodiments, the image capturing module 52 is capable of capturing the images at a frame rate of 2500 frames per second (FPS).

The rotation control unit 6 is disposed inside the plinth 21, and includes a driving element 61, a control module 62 and a memory module 63. The driving element 61 is configured to drive the platter 3 to rotate. More specifically, the driving element 61 is configured to drive the spindle 22 to rotate, so as to make the spindle 22 and the platter 3 to rotate jointly. In this embodiment, the driving element 61 is a motor. The memory module 63 stores a predetermined rotating speed. The control module 62 is coupled to the rotating element 61, the memory module 63 and the processing module 53. The control module 62 is configured to compare the current rotating speed determined by the processing module 53 with the predetermined rotating speed stored in the memory module 63, and to determine whether an absolute value of a difference between the current rotating speed and the predetermined rotating speed is greater than a threshold value. When the absolute value of the difference between the current rotating speed and the predetermined rotating speed is greater than the threshold value, the control module 62 controls the driving element 61 by adjusting output power of the driving element 61 to make the absolute value of the difference between the current rotating speed and the predetermined rotating speed not greater than the threshold value, thereby stabilizing the current rotating speed of the platter 3 within a predetermined range.

In practice, when the spindle 22 and the platter 3 are driven to rotate jointly, the acoustical record 20 placed on the platter 3 co-rotates with the platter 3.

As long as the platter 3 is rotating, the monitoring unit 5 operates to periodically detect the current rotating speed of the platter 3. For example, the light emitter 51 operates to periodically emit light toward the outer surrounding wall 32, so that the image capturing module 52 can periodically capture the images of the outer surrounding wall 32. Then, the processing module 53 operates to analyze and compare the images. In microscopic view, texture of the surface of the outer surrounding wall 32 at different portions may vary, and thus, the images captured at different portions during rotation of the platter 3 are different from each other. The processing module 53 can compare the images, and analyze a difference thereamong to determine the current rotating speed and the rotating direction of the platter 3. Since the acoustical record 20 on the platter 3 co-rotates with the platter 3, the current rotating speed of the platter 3 is substantially equal to a current rotating speed of the acoustical record 20.

It should be noted that the processing module 53 transmits the current rotating speed and the rotating direction to the control module 62 in real time. Upon receiving the current rotating speed, the control module compares the current rotating speed with the predetermined rotating speed. When the absolute value of the difference between the current rotating speed and the predetermined rotating speed is greater than the threshold value, the control module 62 adjusts the output power of the driving element 61 so as to make the current rotating speed of the platter 3 fall within the predetermined range. Accordingly, the current rotating speed of the platter 3 is stable, and the sound produced by the tonearm assembly 4 may have relatively better quality. For example, the predetermined rotating speed is 33 revolutions per minute (RPM), and the threshold value is 3 RPM. When the current rotating speed of the platter 3 is greater than 36 RPM, the control module 62 may reduce the output power of the driving element 61 to decrease the current rotating speed. When the current rotating speed of the platter 3 is less than 30 RPM, the control module 62 may raise the output power of the driving element 61 to increase the current rotating speed.

Figure 5:
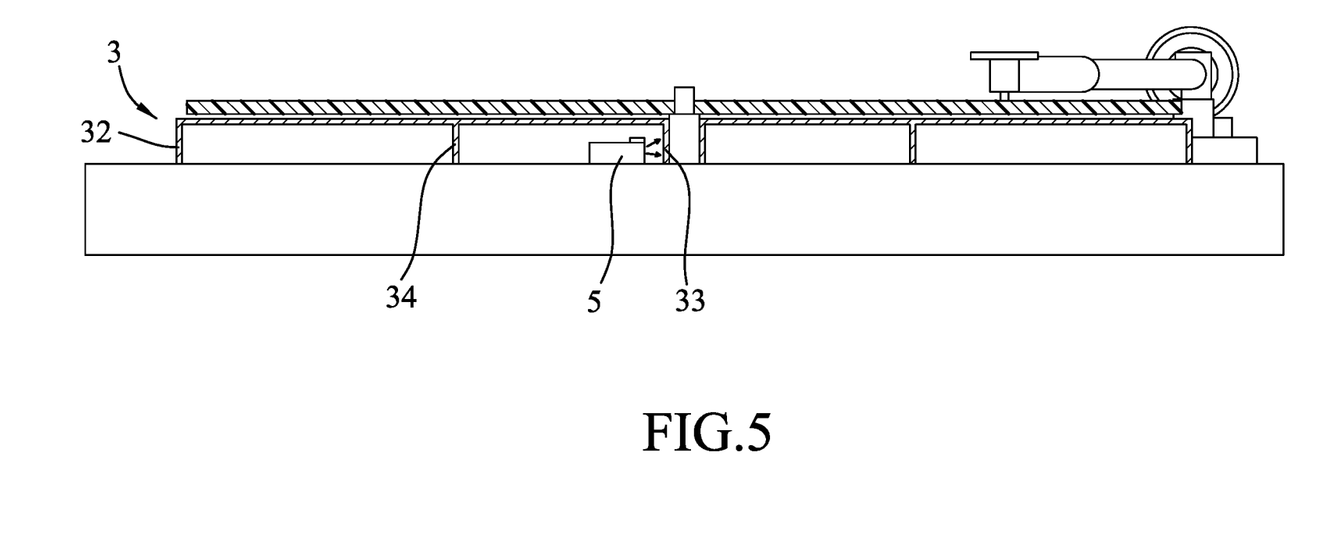
FIG. 5 is a partially sectional schematic view of a second embodiment of the record player according to this disclosure.

Referring to FIG. 5, a second embodiment of the record player according to this disclosure is similar to the first embodiment, and the difference therebetween lies in the arrangement of the monitoring unit 5. In the second embodiment, the monitoring unit 5 is disposed close to the spindle-surrounding wall 33, and the light emitter 51 and the image capturing module 52 (see FIG. 4) are arranged to face the spindle-surrounding wall 33. Accordingly, the light emitter 51 is configured to emit the light toward the spindle-surrounding wall 33, and the image capturing module 52 is configured to capture images of the spindle-surrounding wall 33 to serve as the images of the platter 3.

Figure 6:
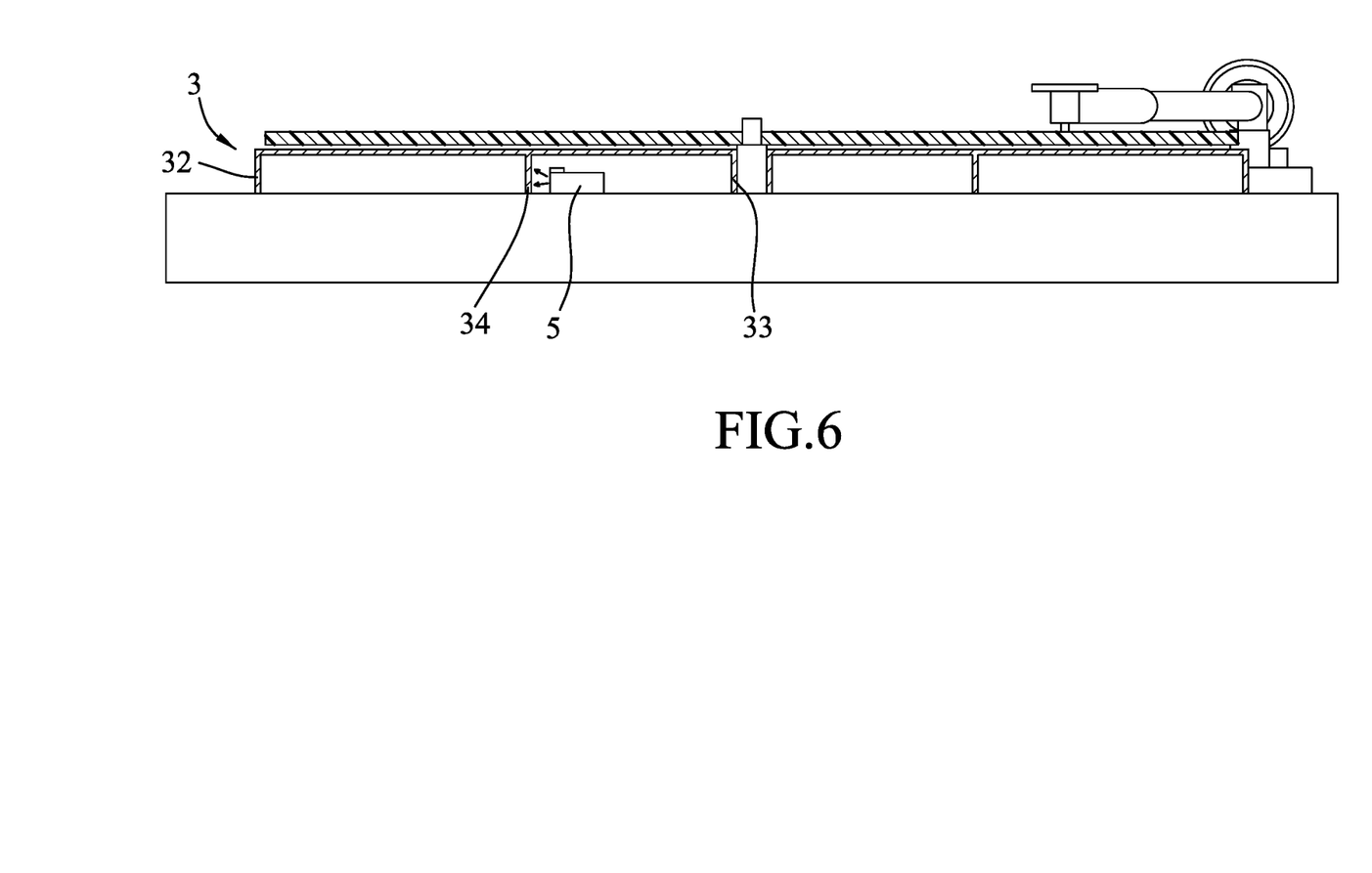
FIG. 6 is a partially sectional schematic view of a third embodiment of the record player according to this disclosure.
Figure 7:
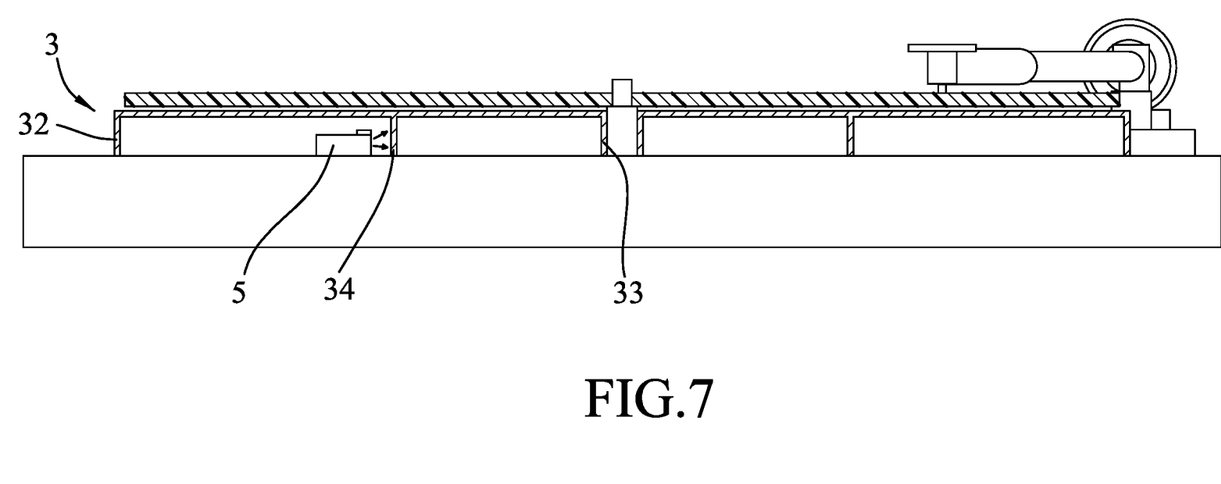
FIG. 7 is a partially sectional schematic view of an alternative modification of the third embodiment of the record player according to this disclosure.

FIGS. 6 and 7 illustrates two different implementations of a third embodiment of the record player according to this disclosure similar to the first embodiment, and the difference therebetween lies in the arrangement of the monitoring unit 5. In the third embodiment, the monitoring unit 5 is disposed close to the inner surrounding wall 34, and the light emitter 51 and the image capturing module 52 (see FIG. 4) are arranged to face the inner surrounding wall 34. Accordingly, the light emitter 51 is configured to emit the light toward the inner surrounding wall 34, and the image capturing module 52 is configured to capture images of the inner surrounding wall 34 to serve as the images of the platter 3. It should be noted that the position of the monitoring unit 5 can be disposed at two different positions that are opposite to each other with respect to the inner surrounding wall 34 as shown in FIGS. 6 and 7, respectively.

In other embodiments, the light emitter 51 and the image capturing module 52 may be arranged to face any other surface of the platter 3 for capturing images of such surface to serve as the images of the platter 3.

Figure 8:
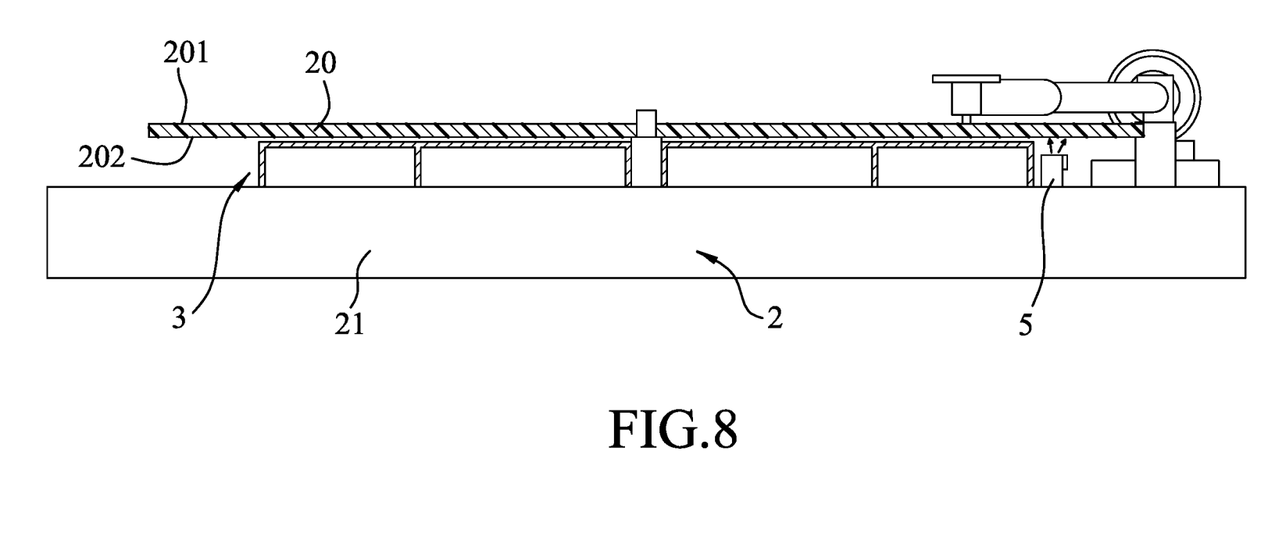
FIG. 8 is a partially sectional schematic view of a fourth embodiment of the record player according to this disclosure.

Referring to FIG. 8, a fourth embodiment of the record player according to this disclosure is similar to the first embodiment, and the difference therebetween lies in the arrangement of the monitoring unit 5 and a size of the platter 3. The acoustical record 20 has a playing surface 201, and a back surface 202 opposite to the playing surface 201. The platter 3 has a diameter smaller than a diameter of the acoustical record 20.

The monitoring unit 5 is disposed out of the platter 3 with the light emitter 51 and the image capturing module 52 being disposed at the same side of the base 2 as the platter 3, and the light emitter 51 (see FIG. 4) is configured to emit light toward the acoustical record 20. More specifically, the monitoring unit 5 is disposed close to the platter 3, and the light emitter 51 and the image capturing module 52 (see FIG. 4) are arranged to face upwardly away from the plinth 2. Accordingly, the light emitter 51 is configured to emit the light toward the back surface 202 of the acoustical record 20, and the image capturing module 52 can capture images of the back surface 202 of the acoustical record 20 periodically while the platter 3 is rotating, so that the processing module 53 (see FIG. 4) can determine the current rotating speed of the acoustical record 20 by analyzing and comparing the images of the back surface 202 of the acoustical record 20. The operations of the processing module 53 and the rotation control unit 6 (see FIG. 4) are the same as those described in the first embodiment, and descriptions thereof are not repeated again for the sake of brevity.

In sum, the record player according to this disclosure can determine the current rotating speed of the acoustical record 20 by analyzing and comparing the images of the platter 3 or the acoustical record 20, without requirement of the shading disk 14 as with the conventional record player shown in FIG. 1. Further, the monitoring unit 5 according to some embodiments of this disclosure is configured to determine the current rotating speed directly from the images of the platter 3, whose surface naturally has a unique optical signature and require no further processing thereon.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A record player for playing an acoustical record, said record player comprising:
   a base;
   a platter rotatably mounted on said base and configured to support the acoustical record thereon;
   a tonearm assembly pivotally mounted on said base and configured to read the acoustical record for producing sound stored by the acoustical record; and
   a monitoring unit secured on said base, and including
      a light emitter configured to emit light toward said platter,
      an image capturing module configured to receive the light reflected by said platter and to capture images of said platter, and
      a processing module configured to receive the images of said platter from said image capturing module, and to determine a current rotating speed of said platter by analyzing and comparing the images captured by said image capturing module at successive time points.

2. The record player of claim 1, further comprising a rotation control unit that includes:
   a driving element configured to drive said platter to rotate;
   a memory module storing a predetermined rotating speed; and
   a control module coupled to said rotating element, said memory module and said processing module, said control module being configured to compare the current rotating speed with the predetermined rotating speed, to determine whether an absolute value of a difference between the current rotating speed and the predetermined rotating speed is greater than a threshold value, and to control said driving element by adjusting output power of said driving element to make the absolute value of the difference between the current rotating speed and the predetermined rotating speed not greater than the threshold value.

3. The record player of claim 1, wherein said platter includes:
   a top plate having a periphery, and configured to support the acoustical record; and
   an outer surrounding wall extending downwardly from said periphery of said top plate toward said base,
   wherein said base, said top plate and said outer surrounding wall together define a space, and said monitoring unit is disposed in said space.

4. The record player of claim 3, wherein said light emitter and said image capturing module are arranged to face said outer surrounding wall, said light emitter is configured to emit the light toward said outer surrounding wall, and said image capturing module is configured to capture images of said outer surrounding wall to serve as the images of said platter.

5. The record player of claim 3, wherein said light emitter and said image capturing module are arranged to face said top plate, said light emitter is configured to emit the light toward said top plate, and said image capturing module is configured to capture images of said top plate to serve as the images of said platter.

6. The record player of claim 3, wherein said base includes a plinth, and a spindle extending upwardly from said plinth,
wherein said platter is co-rotatably connected to said spindle, and further includes a spindle-surrounding wall extending from a center of said top plate toward said plinth and surrounding said spindle.

7. The record player of claim 6, wherein said light emitter and said image capturing module are arranged to face said spindle-surrounding wall, said light emitter is configured to emit the light toward said spindle-surrounding wall, and said image capturing module is configured to capture images of said spindle-surrounding wall to serve as the images of said platter.

8. The record player of claim 6, wherein said platter further includes an inner surrounding wall extending from said top plate toward said plinth and disposed between said outer surrounding wall and said spindle-surrounding wall,
wherein said light emitter and said image capturing module are arranged to face said inner surrounding wall, said light emitter is configured to emit the light toward said inner surrounding wall, and said image capturing module is configured to capture images of said inner surrounding wall to serve as the images of said platter.

9. A record player for playing an acoustical record, said record player comprising:
a base;
a platter rotatably mounted on said base and configured to support the acoustical record thereon;
a tonearm assembly pivotally mounted on said base and configured to read the acoustical record for producing sound stored by the acoustical record; and
a monitoring unit secured on said base, and including
a light emitter configured to emit light toward the acoustical record,
an image capturing module configured to receive the light reflected by the acoustical record and to capture images of the acoustical record, and
a processing module configured to receive the images of the acoustical record from s aid image capturing module, and to determine a current rotating speed of the acoustical record by analyzing and comparing the images captured by said image capturing module at successive time points.

10. The record player of claim 9, further comprising a rotation control unit that includes:
a driving element configured to drive said platter to rotate;
a memory module storing a predetermined rotating speed; and
a control module coupled to said rotating element, said memory module and said processing module, said control module being configured to compare the current rotating speed with the predetermined rotating speed, to determine whether an absolute value of a difference between the current rotating speed and the predetermined rotating speed is greater than a threshold value, and to control said driving element by adjusting output power of said driving element to make the absolute value of the difference between the current rotating speed and the predetermined rotating speed not greater than the threshold value.

11. The record player of claim 9, wherein said platter has a diameter smaller than a diameter of the acoustical record.

12. The record player of claim 11, the acoustical record having a playing surface, and a back surface opposite to the playing surface,
wherein said light emitter and said image capturing module are disposed near to said platter and are arranged to face away from said plinth, said light emitter is configured to emit the light toward the back surface of the acoustical record, and said image capturing module is configured to capture images of the back surface to serve as the images of the acoustical record.

* * * * *